(12) United States Patent
Näslund et al.

(10) Patent No.: US 10,039,059 B2
(45) Date of Patent: Jul. 31, 2018

(54) ENERGY SAVING IN WIRELESS DEVICES

(71) Applicant: Telefonaktiebolaget L M Ericsson (publ), Stockholm (SE)

(72) Inventors: Mats Näslund, Bromma (SE); Göran Selander, Bromma (SE); Vlasios Tsiatsis, Solna (SE); Elena Dubrova, Sollentuna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 350 days.

(21) Appl. No.: 14/766,256

(22) PCT Filed: Dec. 20, 2013

(86) PCT No.: PCT/EP2013/077584
§ 371 (c)(1),
(2) Date: Aug. 6, 2015

(87) PCT Pub. No.: WO2015/090429
PCT Pub. Date: Jun. 25, 2015

(65) Prior Publication Data
US 2016/0007294 A1    Jan. 7, 2016

(51) Int. Cl.
*G06F 21/64* (2013.01)
*H04W 52/02* (2009.01)
(Continued)

(52) U.S. Cl.
CPC ...... *H04W 52/0238* (2013.01); *G06F 1/3296* (2013.01); *G06F 21/64* (2013.01);
(Continued)

(58) Field of Classification Search
None
See application file for complete search history.

(56) References Cited

U.S. PATENT DOCUMENTS 7,231,530 B1 * 6/2007 Miller ............... H04W 52/0225
  709/230
9,146,950 B1 * 9/2015 Cooley .................. G06F 21/64
(Continued)

OTHER PUBLICATIONS

Hugo Krawczyk. LFSR-based Hashing and Authentication. Springer-Verlag Berlin Heidelberg. Y.G. Desmedt (ed.): Advances in Cryptology—CRYPTO '94, LNCS 839, pp. 129-139, 1994.*
(Continued)

*Primary Examiner* — Michael R Vaughan
(74) *Attorney, Agent, or Firm* — Sage Patent Group

(57) ABSTRACT

A method of authorizing a message received at a node in a wireless network is disclosed. The message from a sender device is formed by a plurality of symbols and includes a first message integrity indicator located at a predetermined distance from the start of the message such that further symbols of the message are included after the first message integrity indicator. The position of the first message integrity indicator in the message is determined, and a cryptographic operation is performed on at least some of the symbols of the message before the first message integrity indicator so as to generate a second message integrity indicator before the first message integrity indicator is received. The first and second message integrity indicators are compared, and an indication that the message is not authorized is provided if the second message integrity indicator does not match the first message integrity indicator.

24 Claims, 7 Drawing Sheets

(51) Int. Cl.
    *H04W 4/70*     (2018.01)
    *H04L 29/06*     (2006.01)
    *H04W 12/10*     (2009.01)
    *G06F 1/32*     (2006.01)
    *H04W 12/04*     (2009.01)
    *H04W 12/12*     (2009.01)

(52) U.S. Cl.
    CPC ........ *H04L 63/0428* (2013.01); *H04L 63/123* (2013.01); *H04W 4/70* (2018.02); *H04W 12/10* (2013.01); *H04W 12/04* (2013.01); *H04W 12/12* (2013.01); *Y02D 70/144* (2018.01); *Y02D 70/21* (2018.01); *Y02D 70/24* (2018.01)

(56) References Cited

U.S. PATENT DOCUMENTS

| | | | | |
|---|---|---|---|---|
| 2005/0226190 | A1* | 10/2005 | Lam | H04L 1/0061 370/338 |
| 2011/0194475 | A1* | 8/2011 | Kim | H04L 1/0053 370/311 |
| 2013/0142094 | A1* | 6/2013 | HomChaudhuri | H04W 52/0206 370/311 |
| 2014/0003315 | A1* | 1/2014 | Liu | H04W 4/08 370/311 |
| 2015/0006892 | A1* | 1/2015 | Ekman | H04L 63/0869 713/169 |
| 2015/0098569 | A1* | 4/2015 | Vijayasankar | H04L 63/0428 380/255 |

OTHER PUBLICATIONS

International Search Report and Written Opinion of the International Searching Authority, Application No. PCT/EP2013/077584, dated Sep. 1, 2014.

"IEEE Standard for Local and metropolitan area networks—Part 15.4: Low-Rate Wireless Personal Area Networks (LR-WPANs)", IEEE Standards Association, IEEE std 802.15.4-2011, Sep. 5, 2011, retrieved from the Internet: URL:http//standards.ieee.org/getieee802/d [retrieved Aug. 18, 2014], pp. 131-145, 229-234.

Gascón, "Security in 802.15.4 and ZigBee networks", *Libelium*, Apr. 28, 2009, retrieved from the Internet: URL:http://ww.libelium.com/security-802-15-4-zigbee on Aug. 18, 2014], 5 pp.

Sastry et al, "Security considerations for IEEE 802.15.4 Networks", *Proceedings of the 2004 ACM Workshop on Wireless Security (WISE '2004)*, Oct. 1, 2004, 11 pp.

* cited by examiner

ENERGY SAVING IN WIRELESS DEVICES

CROSS REFERENCE TO RELATED APPLICATION

This application is a 35 U.S.C. § 371 national stage application of PCT International Application No. PCT/EP2013/077584, filed on 20 Dec. 2013, the disclosure and content of which is incorporated by reference herein in its entirety. The above-referenced PCT International Application was published in the English language as International Publication No. WO 2015/090429 A1 on 25 Jun. 2015.

TECHNICAL FIELD

The present invention relates to energy saving in wireless devices. In particular, at least in preferred embodiments, the invention relates to the reduction of unnecessary use of energy in response to malicious wake-up messages.

BACKGROUND

In the coming years it is expected that there will be a rapid growth in so-called machine-to-machine (M2M) applications that use cellular network infrastructure. Such applications involve devices such as sensors and actuators communicating with other devices or network servers, often without direct human supervision. An example application might involve a remote, battery operated environmental sensor that receives measurement requests to which it responds. M2M applications are expected to increase dramatically the number of wirelessly connected devices in use with cellular networks. It has been predicted that a few tens of billions of such devices should be in service by the year 2020.

In systems supporting M2M applications, a feature that is generally needed is a mechanism to trigger (or wake up) a device since such devices typically turn off their communication capabilities in order to save energy. Triggering typically means that an entity in the network triggers a device (which is possibly in a sleep mode) to perform some action and contact the entity (or another entity). This may be for example metering a temperature and reporting it to the network entity.

M2M devices are frequently battery operated devices with limited power resources, and may not have access to power supplies to charge their batteries. Despite this they may be required to operate for very long times. This makes the M2M devices very sensitive to power consumption and vulnerable to unauthorized or fake trigger requests from the network, which could drain the battery. Use of radio requires more energy (by several orders of magnitude) than almost any other operation performed.

Indeed for any low power or constrained devices it is particularly desirable to save power, in particular for wireless devices. Various techniques for Discontinuous Reception (DRX) are known, in which the radio receiver is switched on for short periods of time in predetermined timeslots and can only receive messages in these timeslots. However, DRX is still vulnerable to malicious adversaries aiming to drain a device's battery. The adversary can inject spoofed messages during DRX "awake" cycles and/or can trigger the device to enable radio reception through detection of RF energy (if the device has a so-called "wake-up receiver"). The device will use its radio to receive these messages. The message will be delivered to some application layer function for processing. The application layer may be able to discard the message as spoofed, but there is no guarantee of this. Even if the message is discarded, resources have already been wasted in receiving and pre-processing this message at lower layers. In the worst case scenario the message is not identified by the device as being invalid, and the device therefore "acts" on it, for example turning some actuator "on" or "off" (e.g. opening a locked door) with possibly devastating consequences.

By adding cryptography (message authentication) in the application layer, the situation is greatly improved. At least it is then possible to prevent the device performing application-level actions based on spoofed messages. However, the radio reception and the associated energy waste are still not avoided.

By putting authentication at lower layers (preferably as low as possible, for example the Medium Access Control (MAC) layer) the situation is improved further. However, current techniques still require the entire message to be received before the authenticity can be verified. Radio usage is the main consumer of energy in typical devices (usually 100-1000 times more expensive than processing) and the technique described above still carries out this energy-expensive radio usage.

It would therefore be desirable to enable a device to identify that messages are unauthorised early enough to turn its radio receiver off and thus save energy.

SUMMARY

It is an object of the present invention to address, or at least alleviate, the problems described above.

In accordance with one aspect of the present invention there is provided a node for use in a wireless network. The node comprises a communications unit for receiving a message using radio reception from a sender device in the network, the message being formed by a plurality of symbols and including a first message integrity indicator located at a predetermined distance from the start of the message such that further elements of the message are included after the first message integrity indicator. The node also comprises a position identification unit for determining the position of the first message integrity indicator in the message. The node further comprises a message integrity indicator generator for performing a cryptographic operation on at least some of the symbols of the message so as to generate a second integrity indicator before the first message integrity indicator is received. The node also comprises a comparator unit for comparing the second message integrity indicator with the first message integrity indicator, and indicating that the message is not authorized if the second message integrity indicator does not match the first message integrity indicator.

The message integrity indicator generator may be configured to perform the cryptographic function on the symbols of the message synchronously as they arrive so as to generate the second message integrity indicator before the first symbol of the first message integrity indicator is received.

The comparator unit may be configured to compare symbols of the second message integrity indicator with symbols of the first message integrity indicator synchronously as the symbols of the first message integrity indicator are received.

The communications unit may be configured to disable radio reception in response to the indication that the message is not authorized, and may be configured to re-enable radio reception a predetermined time after reception is disabled.

The cryptographic operation may use a key shared with the sender device, and may comprise a hash function.

The first message integrity indicator may be located in a header portion of the message.

The message integrity indicator generator may be configured to generate one or more additional expected message integrity indicators during receipt of the message, and the comparator unit may be configured to compare the additional expected message integrity indicators with additional message integrity indicators located later in the message than the first message integrity indicator, and indicate that the sender device is not authenticated if any of the additional expected message integrity indicators do not match their corresponding received message integrity indicators.

The location of the first message integrity indicator in the message may be indicated at the start of the message. Alternatively, the location of the first message integrity indicator may be identifiable from the cryptographic operation.

The message integrity indicator generator may be configured to carry out the cryptographic operation on all of the message elements before the first message integrity indicator to generate the second message integrity indicator.

The message integrity indicator generator may be configured to carry out the cryptographic operation on only a sequence number contained in the header of the message to generate the second message integrity indicator. The sequence number may be known before the message is received.

The position identification unit, message integrity indicator generator and comparator unit may together form a finite state machine. They may be configured to operate at the physical layer or data link layer of the network.

The communications unit may be configured to enable radio reception only in predetermined timeslots using Discontinuous Reception.

Each symbol in the message may correspond to a single bit or to a predetermined number of bits.

In accordance with another aspect of the present invention there is provided a node for use in a wireless network. The node comprises a processor and a memory, the memory containing instructions executable by the processor to cause the processor to receive a message using radio reception from a sender device in the network, the message being formed by a plurality of symbols and including a first message integrity indicator located at a predetermined distance from the start of the message such that further elements of the message are included after the message integrity indicator. The memory further comprises instructions to cause the processor to determine the position of the first message integrity indicator in the message and perform a cryptographic operation on at least some of the symbols of the message so as to generate a second message integrity indicator before the first message integrity indicator is received. The memory further comprises instructions to cause the processor to compare the second message integrity indicator with the first message integrity indicator, and indicate that the message is not authorized if the second message integrity indicator does not match the first message integrity indicator.

The node may be an M2M device.

In accordance with another aspect of the present invention there is provided a method of authorizing a message received at a node in a wireless network. The method comprises receiving the message using radio reception from a sender device in the network, the message being formed by a plurality of symbols and including a first message integrity indicator located at a predetermined distance from the start of the message such that further symbols of the message are included after the first message integrity indicator. The method further includes determining the position of the first message integrity indicator in the message and performing a cryptographic operation on at least some of the symbols of the message before the first message integrity indicator so as to generate a second message integrity indicator before the first message integrity indicator is received. The method further includes comparing the second message integrity indicator with the first message integrity indicator, and indicating that the message is not authorized if the second message integrity indicator does not match the first message integrity indicator.

In accordance with another aspect of the present invention there is provided a node for use in a wireless network. The node comprises a message generator for generating a message for one or more receiver devices, the message being formed by a plurality of symbols. The node also comprises a message integrity indicator generator for performing a cryptographic operation on at least some of the symbols of the message so as to generate a first message integrity indicator for insertion into the message at a predetermined distance from the start of the message such that the symbols used in the generation of the first message integrity indicator are located before the first message integrity indicator and some of the symbols of the message are located after the message integrity indicator. The node further comprises a communications unit for sending the message towards the one or more receiver devices.

The cryptographic operation may comprise a hash function and/or a key shared with the one or more receiver devices. The location of the message integrity indicator may be determined by a property of the key, or the message generator may be configured to include in the message an indication of the location of the message integrity indicator.

The message integrity indicator may be located in a header portion of the message. The message integrity indicator generator may be configured to generate one or more additional message integrity indicators for insertion into the message after the first message integrity indicator.

The message integrity indicator generator may be configured to carry out the cryptographic operation on all of the message elements before the location at which the first message integrity indicator is inserted. Alternatively, the message integrity indicator generator may be configured to carry out the cryptographic operation on only a sequence number contained in the header of the message to generate the first message integrity indicator.

In accordance with another aspect of the present invention there is provided a node for use in a wireless network. The node, comprises a processor and a memory, the memory containing instructions executable by the processor to cause the processor to generate a message for one or more receiver devices, the message being formed by a plurality of symbols. The memory also comprises instructions to cause the processor to perform a cryptographic operation on at least some of the symbols of the message so as to generate a first message integrity indicator for insertion into the message at a predetermined distance from the start of the message such that the symbols used in the generation of the first message integrity indicator are located before the first message integrity indicator and some of the symbols of the message are located after the message integrity indicator, and to send the message towards the one or more receiver devices.

In accordance with another aspect of the present invention there is provided a method of sending a message in a wireless network. The method comprises generating a message for one or more receiver devices, the message being formed by a plurality of symbols. The method also comprises performing a cryptographic operation on at least some of the symbols of the message before the verification point so as to generate a first message integrity indicator for insertion into the message at a predetermined distance from the start of the message such that the symbols used in the generation of the first message integrity indicator are located before the first message integrity indicator and some of the symbols of the message are located after the message integrity indicator, and sending the message towards the one or more receiver devices.

The invention also provides a computer program, comprising computer readable code which, when operated by a device, causes the device to operate as any of the nodes described above.

The invention also provides a computer program comprising computer readable code which, when run on a device, causes the device to execute any of the methods described above.

The invention also provides a memory comprising a computer program as just described and a computer readable means on which the computer program is stored. The memory may be arranged in the form of a computer program product.

The invention also provides a vehicle or vessel containing any of the nodes described above.

The invention is based on cryptographic protection (authentication) at a "low" level in the stack, advantageously the Medium Access Control (MAC) layer (or potentially even PHY layer). For simplicity we shall in the sequel assume the MAC layer. Cryptography at these layers are known (e.g. 802.11i or GSM) but a problem with all prior art techniques is that the authentication "verification" information is put at the end of the message. As radio is inherently a serial medium, this necessitates the reception of the whole message before authenticity can be verified.

BRIEF DESCRIPTION OF THE DRAWINGS

Some preferred embodiments of the invention will now be described by way of example only and with reference to the accompanying drawings, in which.

DETAILED DESCRIPTION

Figure 1:
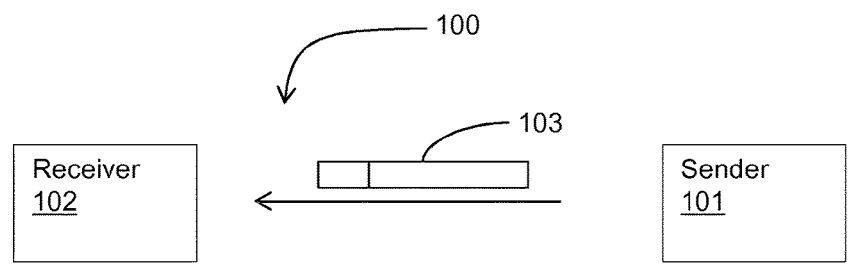
FIG. 1 is a schematic illustration of selected elements of a wireless network.

FIG. 1 is a schematic illustration of selected elements of a wireless network 100. The network 100 includes a node which for the present purposes acts as a sender device 101 (e.g. a base station) and a node acting as a receiver device 102 (e.g. a user device or M2M device). The receiver device 102 may be configured to operate in Discontinuous Reception (DRX) mode so that it receives data only in predetermined time slots negotiated (or otherwise agreed) with the network. At other times its radio is turned off and the receiver device 102 enters a low power state. However the same approach may be used in continuous systems. It will be appreciated that sender devices and receiver devices are not mutually exclusive: user devices and base stations operate both to receive and send messages. Similarly, the sender device may send messages to many receiver devices at once, for example as a broadcast message. However, for the purposes of the following discussion it is convenient to consider the requirements for sending a message and receiving a message separately, and therefore that when a network node is receiving a message it is a "receiver device" 102 and when it is sending a message it is a "sender device" 101, and to consider only one device at a time.

In the following discussion it is assumed that the sender device 101 and receiver device 102 have access to a shared secret key. The key can be shared by any known mechanism. It will be appreciated that, potentially, public-private key techniques could also be employed, but the approach is simpler to describe in the context of a shared key.

When the sender device 101 wishes to communicate with the receiver device 102 it sends a message 103. The receiver device 102 needs to authenticate, or authorize, this message to determine whether or not it was really sent by the sender device 101 and/or whether it has been tampered with. This authorization needs to be carried out as early in the message as possible so that, if the message was not sent by an authorized sender or has in some way had its integrity compromised, the receiver device can switch off its radio before the end of the message is received.

Figure 2:
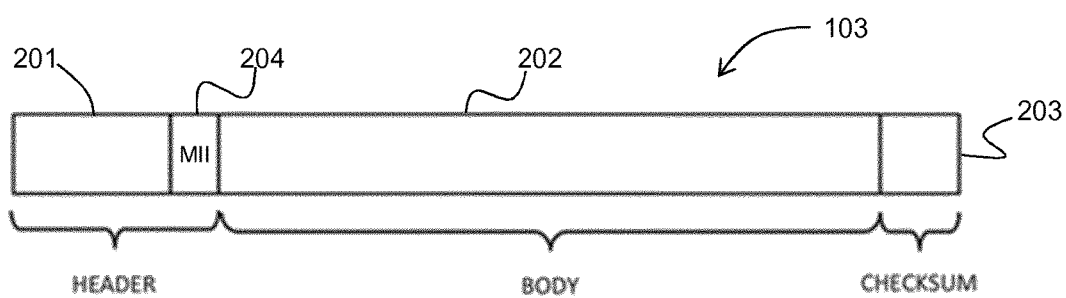
FIG. 2 is a schematic illustration of symbols of a message sent from a sender device to a receiver device in the network of FIG. 1.

FIG. 2 is a schematic illustration of symbols of a message 103 sent from the sender device 101 to the receiver device 102. The message 103 includes a header 201, body 202 and checksum 203. A first message integrity indicator (MII) 204 is also included in the message at some point before the end of the message. In the example shown in FIG. 2 the first MII 204 is located at the end of the header but, as will become apparent, other locations are possible. The first MII 204 is generated by the sender device using the shared key and a cryptographically secure hash function, applied to at least a part of the message.

When the receiver device 102 starts receiving the message 103 it begins processing the message symbolwise simultaneously (or nearly simultaneously) with the receipt of the symbols, i.e. the processing is initiated while the message is still being received. The receiver device 102 effectively includes a Finite State Machine (FSM) integrated within the MAC layer which processes the message (more or less)

simultaneously with the sequential reception of message symbols (a symbol typically representing a bit or a predetermined number of bits), i.e. the content of the message is processed during the reception of the message.

Figure 3:
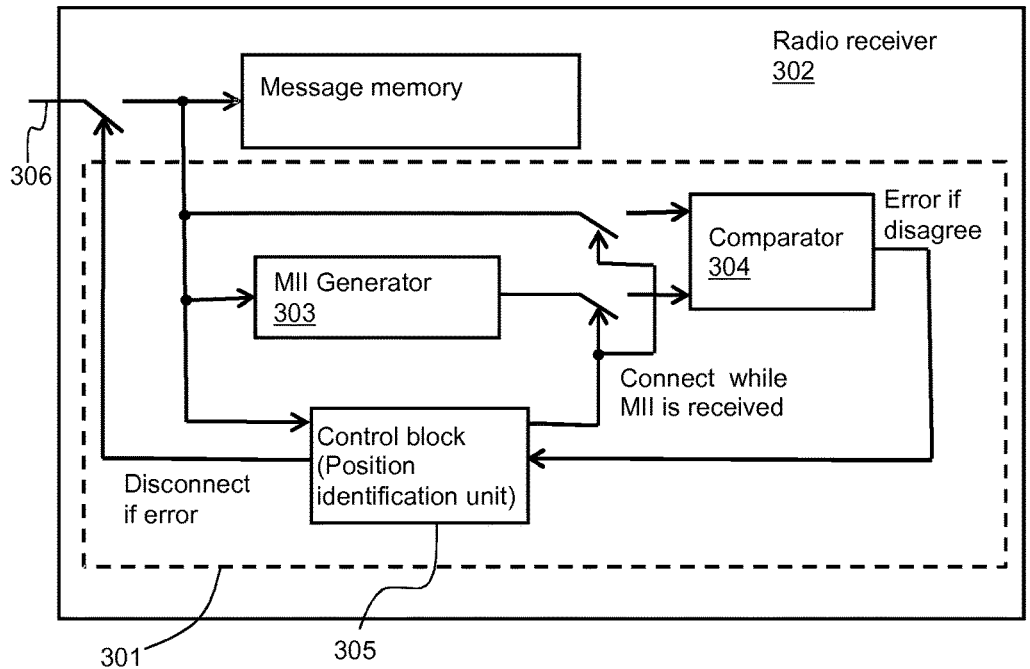
FIG. 3 is a schematic illustration of a Finite State Machine for use in a radio receiver of a network node.

FIG. 3 is a schematic illustration of a FSM 301 for use in a radio receiver 302 of a receiver device 102. The FSM 301 includes an MII generator 303, comparator 304 and control block 305. As a message arrives through an input 306, its symbols are passed through the MII generator 303. The MII generator 303 uses the shared key to compute a second MII from the message symbols as they arrive one-by-one. This second MII is effectively the MII that the receiver would expect to see in the message, given the symbols at the start of the message. The control block identifies the position of first MII in the message. This may be achieved for example by counting the message symbols until the symbol corresponding to the start of the first MII 204 is reached, although other approaches are discussed below. Once the first MII 204 is reached the control block 305 activates the comparator 304. As the symbols corresponding to the MII 204 in the message arrive, the comparator 304 compares the second MII with the MII 204 received in the message 103. If the first and second MIIs do not match, the comparator 304 sends an error signal to the control block 305, disabling further reception and processing. If the control block receives an error signal from the comparator, it disables the radio receiver from receiving further message symbols. If no error signal is received by the control block, the radio receiver continues to receive the message.

If an incorrect MII has been received, leading to disabling of the receiver, the receiver device 102 should have some means to turn radio reception on again, to prevent it becoming unreachable even to the authorized sender 101. A number of possibilities exist:

1. The device switches the receiver back "on" a predetermined time after the receiver has been turned off. In a "slotted" system, the time may correspond to one or more discrete time slots.
2. In a system using pre-scheduling, the device may activate radio reception at the next scheduled transmission/reception.
3. The device switches the receiver on after some out-of-band control message is received.
4. The receiver and sender have a scheme for turning the receiver on and off which is secret based on the shared secret key, so the transmissions are pre-determined only for those with the key.

As previously discussed, a variety of cryptographically secure hash function can be used for defining an MII. Three examples of such hash functions are provided: cryptographic CRC and Toeplitz hashing and self-synchronous stream ciphers, but it will be appreciated that other options are available. The three examples described allow symbolwise simultaneous (or nearly simultaneous) processing.

It will be noted that the examples given below are bit-oriented hash functions. If each received symbol represents more than one bit, then each received symbol may lead into performing plural bit-wise steps/operations of the hash function computation.

Cryptographic CRC Hashing

As a first example, the sender device 101 and receiver device may use a cryptographic Cyclic Redundancy Check (CRC) which is described in Krawczyk, H., "LFSR-based Hashing and Authentication", In Advances in Cryptology—CRYPTO '94, Lecture Notes in Computer Science, Volume 839, Springer, 1994, pp 129-139 and can be defined as follows. For each irreducible polynomial p(x) of degree n over the Galois Field of order 2, GF(2), we associate a hash function $h_p$ such that for any message M of length m bits, the authentication tag $h_p(M)$ is defined as the coefficients of polynomial $M(x) \cdot x^n \mod p(x)$.

It is known that for any value of n and m and for any message M, no adversary can succeed in breaking the authentication with the cryptographic CRC with probability larger than $e \leq (m+n)/(2^{n-1})$.

MIIs defined in this way are the cryptographic version of well-known CRC codes used for detection of random information errors in data networks. The computation of MIIs is based on the same operation of polynomial modular division and retains most of the simplicity of the regular CRC's except that, in the present case, the dividing polynomial is p(x) variable.

Implementing the generation of such an MII in hardware is simple and efficient. The operation of division modulo a polynomial over GF(2) can be implemented through a Linear Feedback Shift Register (LFSR) with taps determined by the dividing polynomial p(x). Since the same operation is used for standard CRC's there are many references in the literature on its implementation. Even the multiplication by the $x^n$ factor is implemented in many cases without penalty in hardware or performance. However, in the standard CRC the dividing polynomial is fixed and known in advance and most circuits that implement it have the particular taps hardwired into the circuit. A cryptographic CRC needs an implementation where the connections (determined by the polynomial) are programmable. The actual position of these connections is the key for the hashing which should be configurable and secret. Note that some non-cryptographic CRC circuits also may use programmable connections if they need to support different CRC standards (each one determines a different polynomial) or to support different polynomial degrees. It will be appreciated that, if each received symbol encodes plural bits (e.g. 4 bits per symbol), then the LFSR would be clocked plural (e.g. 4) steps for each received symbol. Alternatively, an LFSR defined over GF ($2^4$) may be used instead.

Efficient implementations of CRC's in software also exist. In these implementations significant speed up is achieved by using pre-computation tables. These tables depend on the particular key polynomial. Therefore, they are computed only once per key which is affordable in many applications.

The key for the cryptographic CRC hash functions is a random irreducible polynomial. The time complexity of generating such a polynomial of degree n is $O(n^3)$ bit operations or, in a software implementation, is $O(n^2)$ word operations (mostly XOR's and SHIFT's). Therefore, it is efficient enough for applications in which the key is changed only sporadically (e.g. at the beginning of a network session). Algorithms for generating random irreducible polynomials can be found in Gordon, J. A., "Very simple method to find the minimal polynomial of an arbitrary non-zero element of a finite field", Electronics Letters, Vol. 12, 1976, pp. 663-664.

The hash functions in the CRC family are essentially defined by the polynomial p(x) and not by the length of the messages. Therefore, they can be applied to messages of different lengths as it is desirable in practice. In this case, one has to treat the polynomial M(x) corresponding to the message M as having a leading coefficient '1' (i.e., if M is of length m, then M(x) is of proper degree m). This determines a one-to-one mapping between messages and polynomials and, in particular, prevents changing the message by just appending zeros to it. It will be noted that, in practice, if the MII is inserted at a pre-determined position within the header, this implies a fixed "message" length since the message consists of those bits in the header immediately preceding the inserted MII value.

Toepliz Hashing

As a second example, the sender device 101 and receiver device 103 may use Toepliz hashing technique which multiplies the binary vector corresponding to the message by a random matrix. A Toepliz matrix can be generated using an LFSR with n random bits and a random irreducible polynomial of degree n. Consecutive states of an LFSR represent consecutive columns of a Toepliz matrix.

LFSR-based Toepliz hashing is again described in Krawczyk and is defined as follows. Let $p(x)$ be an irreducible polynomial over GF(2) of degree n. Let $s_0, s_1, \ldots$ be the bit sequence generated by a LFSR with taps corresponding to the coefficients of $p(x)$ and initial state $s_0, s_1, \ldots, s_{n-1}$. For each such polynomial $p(x)$ and initial state $s=0$ we associate a hash function $h_{p,s}$, such that for any message $M=M_0 M_1 \ldots M_{m-1}$ of binary length m, $h_{p,s}(M)$ is defined as the linear combination $\oplus_{j=0}^{m-1} M_j \cdot (s_j, s_{j+1}, \ldots, s_{j+n-1})$.

The LFSR advances its state with each message bit. (It will again be appreciated that each received symbol may represent more than one bit). If this bit is '1' the corresponding state is accumulated into an accumulator register, if the bit is '0' the state is not accumulated.

It is known that, for any value of n and m and for any message M, no adversary can succeed in breaking the authentication with the LFSR-based Toepliz hashing with probability larger than $e \leq m/(2^{n-1})$.

Most of the remarks above regarding practical implementation of CRC's hold for LFSR-based Toepliz hashing.

Self-Synchronous Stream Ciphers

The use of bit-oriented self-synchronous stream ciphers is also possible. Essentially, such functions compute the bitwise encryption of a message in dependence of previously generated encrypted bits.

Somewhat simplified, a self-synchronizing stream cipher consists of three main components, an initialization function, an output generating function $F_c$, and a state update function as described below.

First, a "state" variable S is initialized, typically $S_0=00 \ldots 0$ or some other fixed value is used. The decryption of some stream of bits, $C_0, C_1, \ldots$, using key K and producing plaintext bits $P_0, P_1, \ldots$ now proceeds as follows:

for j=0, 1, . . . do (**)

$P_j = C_j \text{ XOR } F_c(K, S_j)$;

$S_{j+1} = C_j \| (S_j \!>\!> 1)$;

where >> denotes right shift and $\|$ is concatenation. Encryption works similarly. For the present purposes only one of the encryption or decryption processes need to be implemented.

The idea of a self-synchronizing stream cipher is that if synch is lost (data bits are lost in transit) the state $S_j$ will eventually recover as it is filled up again by received bits $C_j$. However, in the present application it must be assumed that bits are not lost. Rather the property used is bit-by-bit (or, more generally, symbol-by-symbol) processing resulting in one output bit for each input bit, allowing finite-state-machine implementation similarly to the CRC and Toeplitz hashing.

Thus, on the sender side, starting from a key and a message, the MII added (which will ultimately be the first MII at the receiver, if no adversary interferes) consists of the t last bits resulting from decrypting (or encrypting) the header up to the position where the MII is inserted.

On the receiver side, the second MII consists of the t last bits resulting from decrypting (or encrypting) the (received) header up to the position of the MII. The second MII generated in this manner is compared against the actual received (first) MII.

All of the implementations described above have in common that the second (expected) MII can be generated in real time bitwise (or symbolwise) on the fly as the message is received by the receiver device 102, just in time to be compared against the first MII as it is received. This ensures that the radio can be disabled very early in the message and no further energy is wasted. It also makes implementation in hardware simple.

Figure 4:
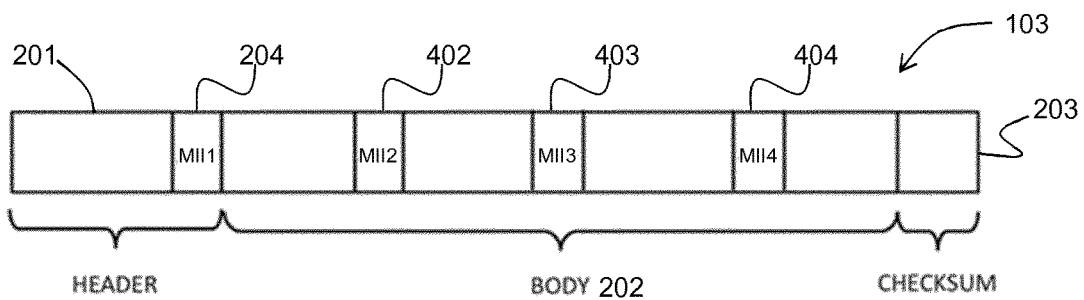
FIG. 4 is a schematic illustration of symbols of an alternative message.

It will be appreciated that further features can be added to the system described above. For example, as shown in FIG. 4, in addition to the (first) MII 204 inserted at the end of (or elsewhere in) the header, one or more additional MIIs 402, 403, 404 may also be inserted at different places in the message, either at regular intervals or at intervals with different lengths. The position of the intervals may be decided based on the expected fault rate and the overhead associated with creating MII check points.

The sender device 101 generates the MIIs 204, 402, 403, 404 for the positions which are defined by the message format and includes them in the message. The MIIs may depend only on those bits/symbols being placed between two subsequent MIIs, or, the MIIs may be "aggregate", i.e. each MII may depend on all bits (symbols) occurring before the MII. In particular one previously computed MII may be used as part of the input when computing a subsequent MII.

At the receiver device 102, an FSM similar to that shown in FIG. 3 is integrated within the MAC layer. The control block 305 is extended to store information about the intervals between MIIs in the message format. It counts the message symbols until the next MII is reached and then it activates the comparator. In the simple case when the intervals between the MIIs are identical, counting can be implemented by a counter which counts the number of symbols in the interval between MIIs and then re-initializes itself to 0. If the control block receives an error signal from the comparator, it disables the radio receiver from receiving further message symbols. The message receiving is stopped as soon as any MII check fails or after a predetermined number of fails.

It is also possible to vary the location of the MII verification point in the message. For example, the initial symbols of the message (and/or the serial number of the message) may indicate how many symbols should be expected before the MII. Alternatively, some property of the shared key (e.g. the value of the key) may define how many symbols of the message should be located before the MII verification point. This would increase the security, as without access to the key an attacker would not even know which bits correspond to data and which correspond to the MII.

It will be appreciated that scenarios exist where there are many possible senders, all authorized to trigger a particular receiver, or many sessions with the same sender. Different keys may be employed by the different senders or in the different sessions. In these scenarios the receiver needs to determine which key (and possibly other parameters) should be used to process and compute the MII. To this end, the receiver may use an identifier of the sender (e.g. MAC address) and/or some explicit meta data located in the message before the MII, e.g. meta data in the header, to determine which key to use. This meta data may, but does not need to, be included in the computation of the MII.

As discussed above, if the entire portion of the message before the MII checkpoint is used to calculate the (second) MII 204, then it is important that the calculation is done as a bit-serial (or symbol-serial) implementation on the fly to allow the receiver to generate the second (expected) MII "just in time" to compare with the received (first) MII as it arrives. The whole header, up to the point where the MII appears is protected from modification or spoofing.

In some circumstances a less rigorous protection of the header may be sufficient, in which case it may be possible to provide more time for the receiver device to calculate the second MII, and the MII calculation need not necessarily be bit-serial.

Figure 5:
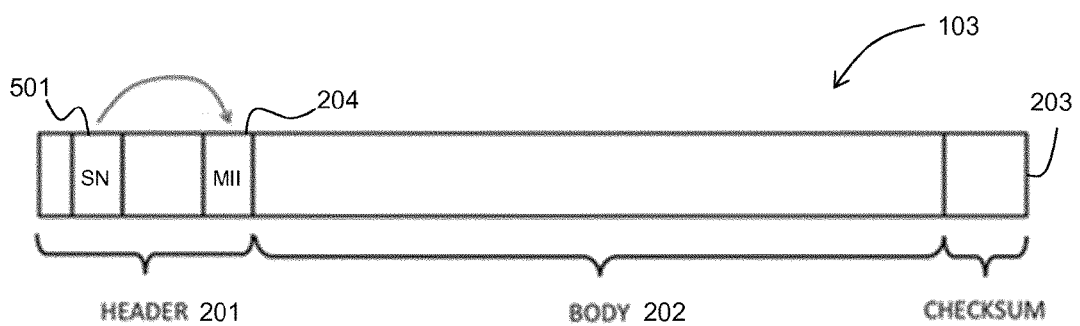
FIG. 5 is a schematic illustration of symbols of a further alternative message.

In one alternative, as shown in FIG. 5, the header 201 may comprise a "sequence number" (SN) 501 or the like, identifying messages. Most MAC layers provide such identifiers in any case. To allow more general computations of MII, MII coverage can be limited so that only SN is protected. In this embodiment, HMAC (Keyed-Hashing for Message Authentication, RFC 2104, IETF, February 1997) or any reasonably efficient message authentication function may be used.

Initially, no message has been transmitted so SN may be assumed set to "0". At this point (before any message is even sent) it is still possible for both sender and receiver to compute the MII corresponding to SN=0. The receiver does so, and stores the expected MII=MII(0) in a memory.

When the first message is received, the receiver just checks SN as it is received in the header by bit or symbol-wise comparison. Assuming SN=0, the receiver can just compare the received MII with the value from the pre-computed table. The receiver accepts or rejects (and disables reception) accordingly. In case of acceptance, the receiver computes MII(1), preparing for the next expected message, In order to accommodate the situation in which messages are lost or re-ordered, the receiver can maintain a small "window" of the next possible values, e.g. when SN=j is the next expected sequence number, MII(j−1), MII(j), MII(j+1) are all already pre-computed to compare against.

It will also be appreciated that it is not absolutely necessary for the system to calculate an identical second MII for comparison with the first MII contained in the message. It may be possible for the cryptographic operation carried out by the MII generator to generate a second MII which can be compared with the first MII in the message using a second operation which need not be a direct match. In general a scheme could be based on the first and second MII satisfying a predefined relation, including but not limited to the equality relation, i.e. R(first MII, second MII)="true". An example of such a relation may be Hamming distance falling within a certain (upper) bound.

Figure 6:
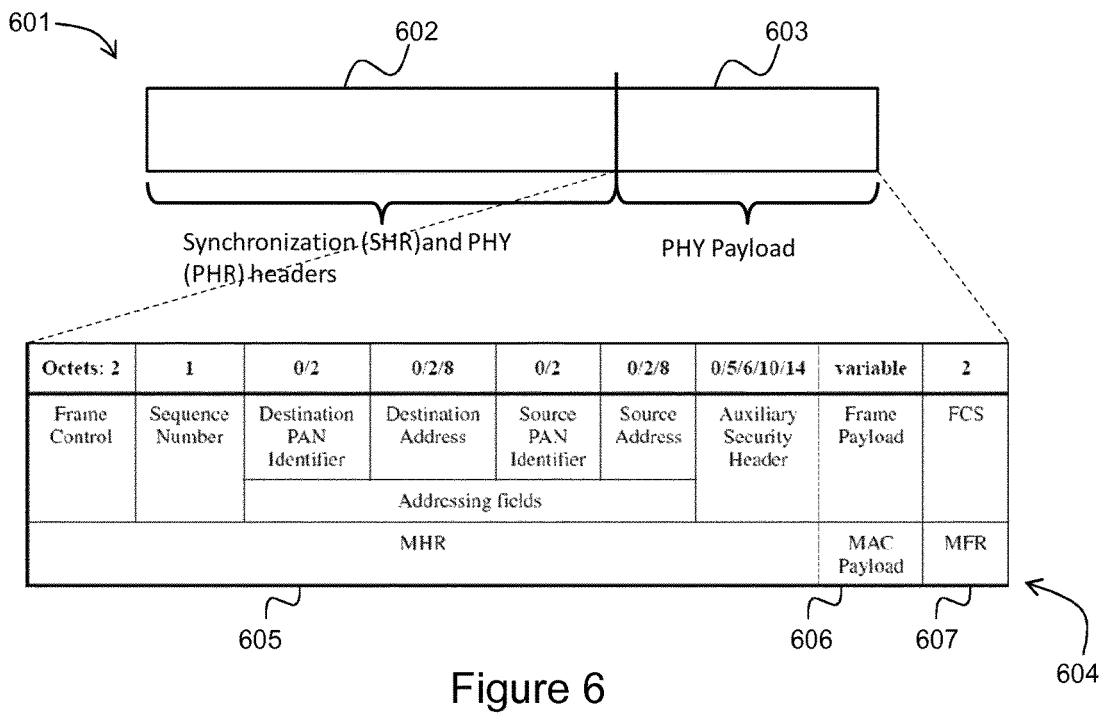
FIG. 6 shows the format of an IEEE 802.15.4 PHY/MAC layer frame.

The system described above may be applied in devices operating according to IEEE 802.15.4. The IEEE 802.15.4 PHY/MAC layer frame format 601 is shown in FIG. 6 (Chapter 4 of IEEE Std 802.15.4™-2011, IEEE Standard for Local and metropolitan area networks—Part 15.4: Low-Rate Wireless Personal Area Networks (LR-WPANs)).

The synchronization (SHR) and PHY headers (PHR) 602 are dependent on the specific PHY layer used for the IEEE 802.15.4. The IEEE 802.15.4 specification defines 6 different PHY layers (QPSK, BPSK, ASK, CSS, UWB, GFSK). The SHR and PHR are used for the receiver to detect the beginning of the frame among random flowing bits and the length of the frame in octets.

The PHY payload 603 is essentially the MAC frame 604 also shown in FIG. 6. The main parts of the MAC frame 604 are the header (MHR) 605, payload (MAC payload) 606 and the footer (MFR) 607. The MAC header 605 contains flags for the next header fields (Frame Control that contains, among others, information about which type of address is used as source/destination address in the subsequent header fields), packet sequence number for duplicate packet detection, source/destination PAN (Personal Area Network) identifiers, source and destination address information and security headers if the packet is protected with link layer security mechanisms.

Figure 7:
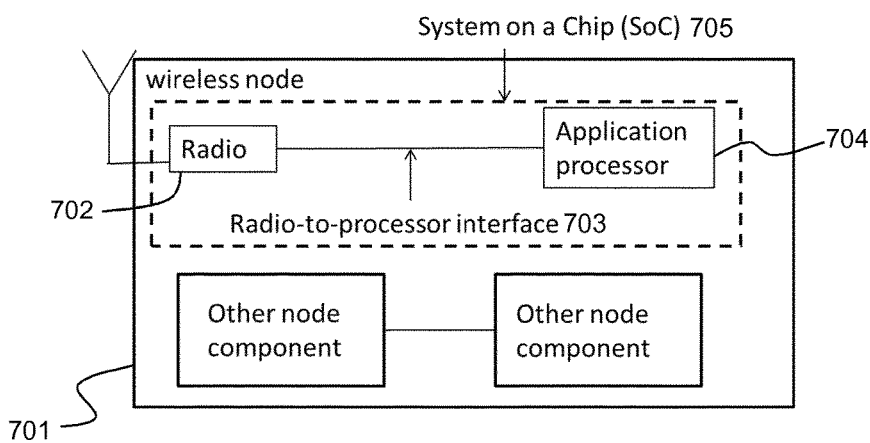
FIG. 7 is a schematic diagram of a typical wireless node component implementing the IEEE 802.15.4 standard.

FIG. 7 is a schematic diagram of a typical wireless node component 701 implementing the IEEE 802.15.4 standard. Such products typically include a digital radio module 702 exposing an API 703 towards an application processor 704. The radio module 702 and processor 704 may be packaged together in a System on a Chip (SoC) 705. In any form of packaging the API between the radio module and the application processor is payload-based. This means that, upon transmission, the application processor 704 provides the IEEE 802.15.4 MAC frame payload to the radio module and the radio module transmits the payload over the air. And upon successful reception of a MAC frame destined for the current wireless node the radio module provides the payload as well as some other auxiliary data (e.g. received signal strength, timestamps etc) to the application processor. The application processor can also configure the radio module with its own address (for destination address filtering), its own PAN identifier (for filtering packets on the PAN identifier) and other radio parameters such as transmission power.

Therefore the system described above can be embodied in the internal radio module implementation (e.g. the Finite State Machine for reception). However, the application processor 704 may need to configure the radio module 702 with the correct Message integrity indicator(s) (MIIs) that the radio FSM should expect and/or necessary parameters such as the shared key to compute the MIIs. Moreover, the application processor 704 should also indicate the number of MIIs and their positions in the packet if the multi-MII mode is enabled.

Some wireless devices are much simpler than those that are IEEE 802.15.4 compliant, and in such devices the interface to the application processor is usually bit or octet based. In such devices, the application processor typically implements framing of PHY layer packets and MAC layer procedures in software.

Therefore the described system can have another embodiment related to other PHY/MAC layers different from IEEE 802.15.4. With these simple radios, depending on their sophistication, the radio may include application-processor-controlled hardware to shut down the radio when an incorrect MII is detected.

Figure 8A:
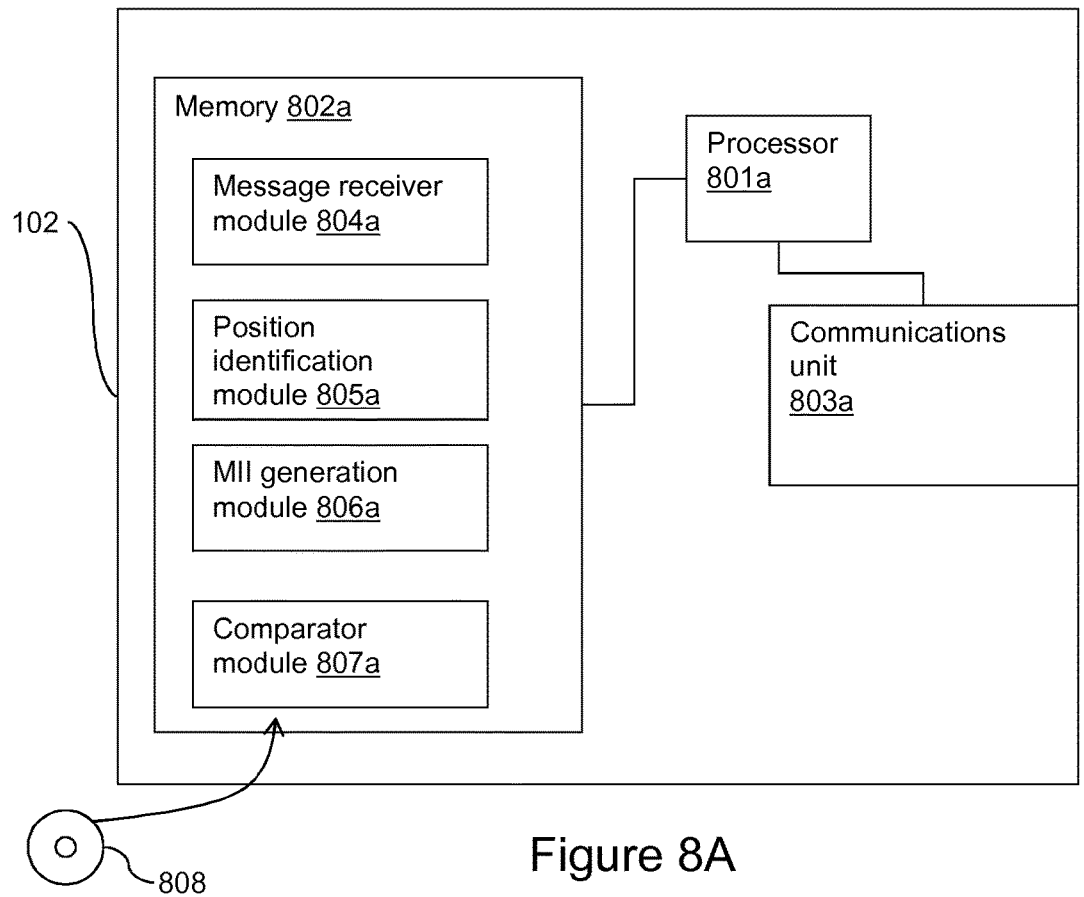
FIGS. 8A and 8B are schematic diagrams illustrating some of the structure of implementations of a node acting as a receiver device.

FIG. 8A is a schematic diagram illustrating some of the structure of one implementation of a node acting as a receiver device 102. In this implementation the node includes a processor 801a, memory 802a and communications unit 803a for communicating with other entities in the network. The memory 802a includes instructions executable by the processor 801a to operate the communications unit 803a, and further includes a message receiver module 804a having instructions causing the processor to receive a message 103 using radio reception from the sender device 101. A position identification module 805a contains instructions to cause the processor to count the symbols of the message or otherwise identify when the verification point is reached. An MII generation module 806a contains instructions for the processor to run one or more cryptographic operations to generate an expected (second) MII. A comparator module 807a contains instructions to cause the processor to compare the expected MII with the received first MII, and to indicate that the sender device is not authenticated if the expected MII does not match the received MII. The instructions 804a, 805a, 806a, 807a may be in the form of software introduced into the memory from a software product 808 such as a CD, DVD or disk.

Figure 8B:
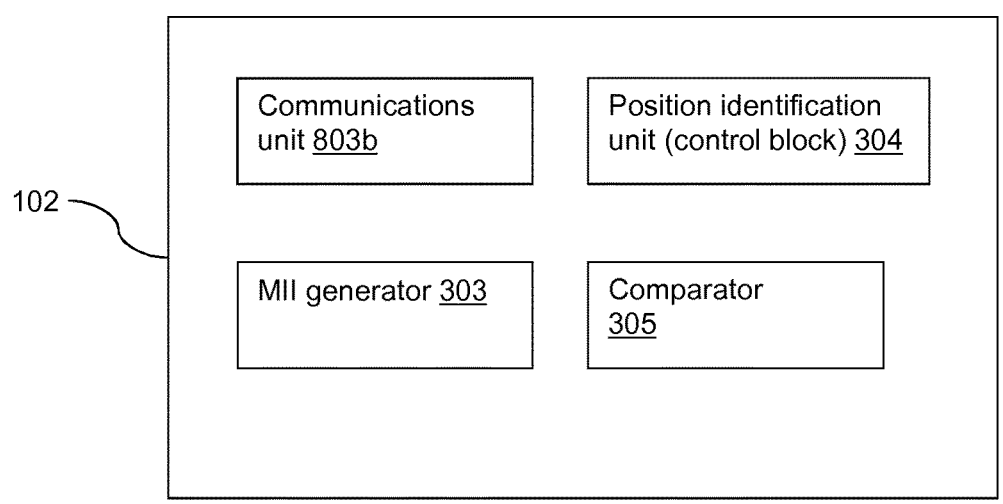

FIG. 8B is a schematic diagram illustrating an alternative implementation of a node acting as a receiver device 102 having a communications unit 803b for receiving messages, a position identification unit (which may act as control block) 304 for counting symbols of the message to identify the position of the verification point, an MII generator 303 for generating an expected (second) MII, and a comparator for comparing the expected MII with the received MII, and indicating that the sender device is not authenticated if they do not match. In one embodiment this may be part of a memory, such that the units are interacting units provided as software in the memory. In another embodiment (as described above) it could illustrate part of a processor, the interacting units provided as hardware in the form of suitable circuitry such as a FSM. It will be appreciated that a combination of these two embodiments is also possible.

Figure 9A:
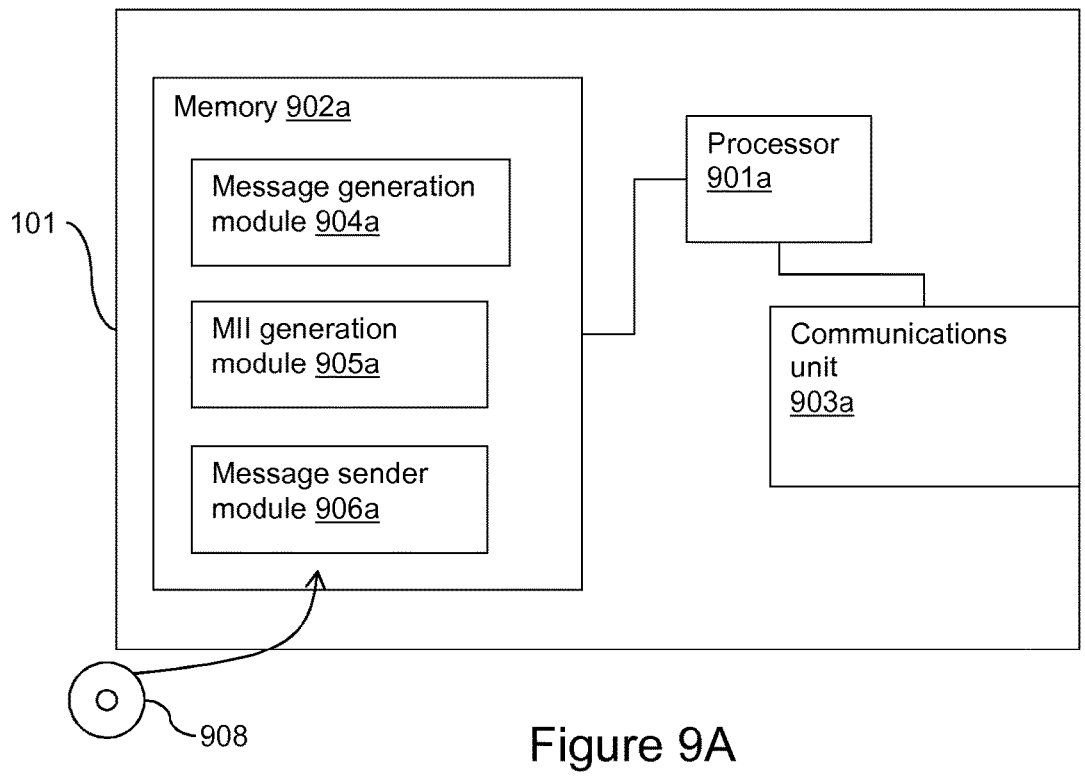
FIGS. 9A and 9B are schematic diagrams illustrating some of the structure of implementations of a node acting as a sender device.

FIG. 9A is a schematic diagram illustrating some of the structure of one implementation of a node acting as a sender device 101. In this implementation the node includes a processor 901a, memory 902a and communications unit 903a for communicating with other entities in the network. The memory 902a includes instructions executable by the processor 901a to operate the communications unit 903a, and further includes a message generator module 904a having instructions causing the processor to generate a message 103 for the receiver device 102. An MII generator module 905a contains instructions to cause the processor to run one or more cryptographic operations to generate an MII 204 for insertion into the message at the verification point. A message sending module 906a contains instructions to cause the processor to send the message towards the receiver device 102. The instructions 904a, 905a, 906a may be in the form of software introduced into the memory from a software product 908 such as a CD, DVD or disk.

Figure 9B:
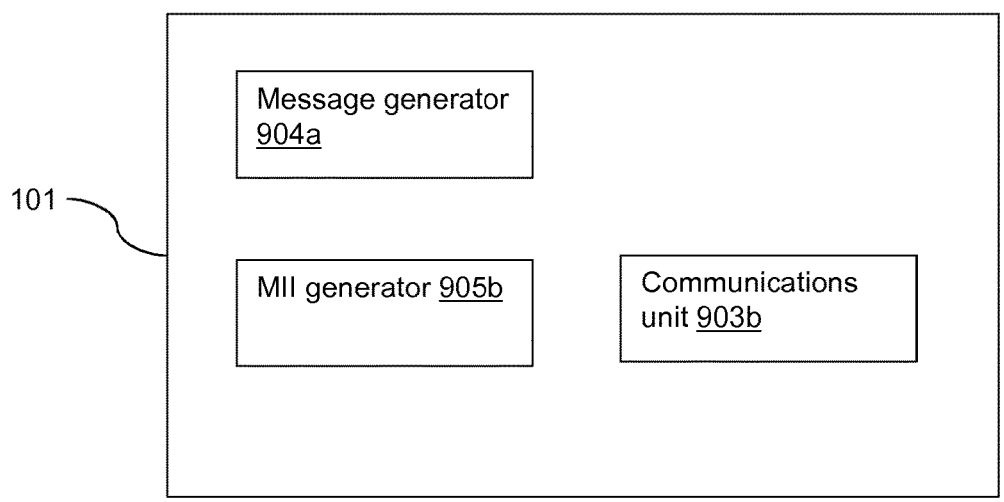

FIG. 9B is a schematic diagram illustrating an alternative implementation of a node acting as a sender device 101 having a message generator 904b for generating a message for the receiver device 102. An MII generator 905b runs one or more cryptographic operations to generate an MII 204 for insertion into the message at the verification point. A communications unit 903b sends the message towards the receiver device 102. In one embodiment this may be part of a memory, such that the units are interacting units provided as software in the memory. In another embodiment it could illustrate part of a processor, the interacting units provided as hardware in the form of suitable circuitry. It will be appreciated that a combination of these two embodiments is also possible.

Figure 10:
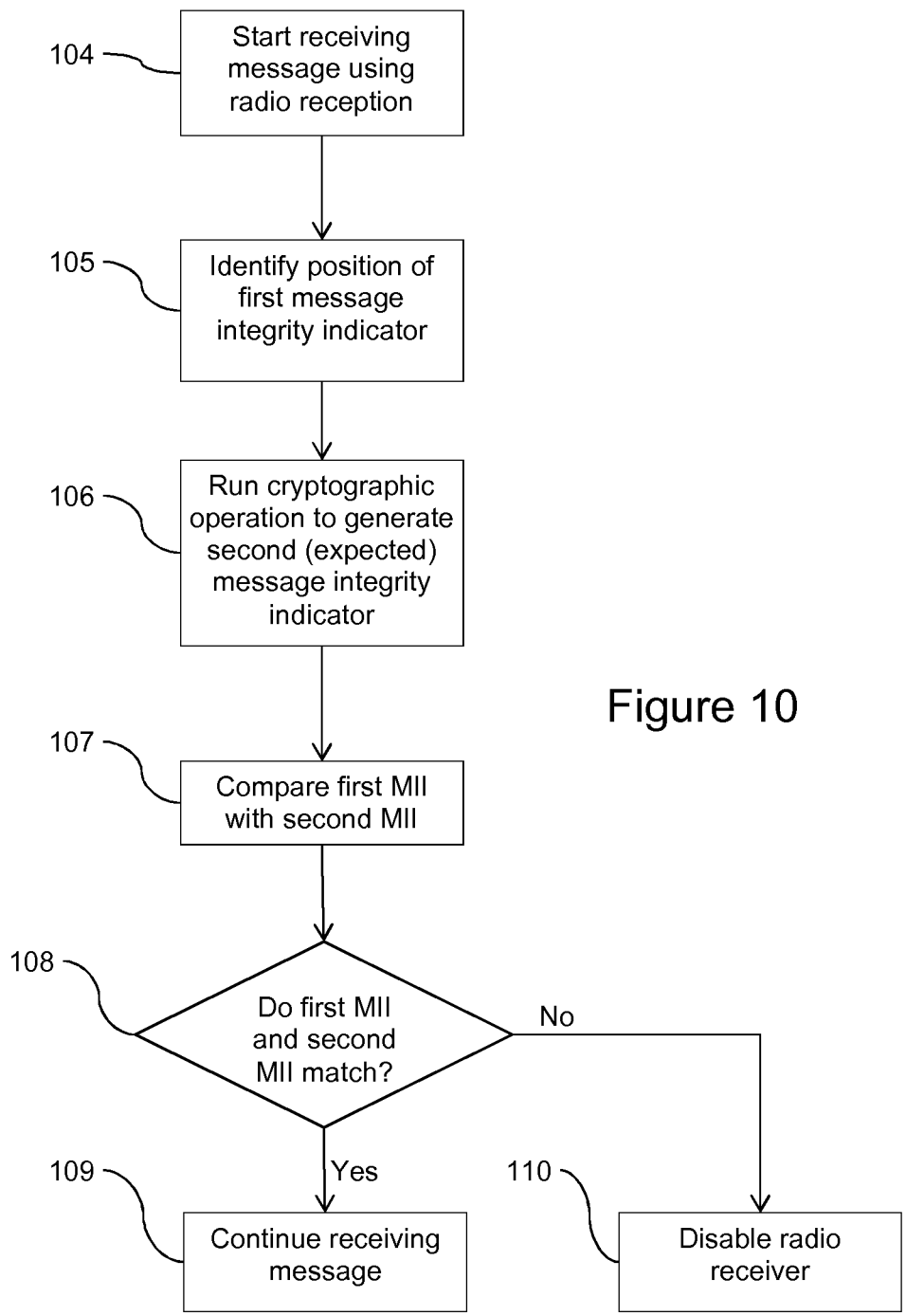
FIG. 10 is a flow diagram illustrating the steps carried out by a node acting as a receiver device upon receipt of a message.

FIG. 10 is a flow diagram illustrating the steps carried out by a node acting as a receiver device 102 upon receipt of a message. The node starts to receive the message 104. The position of the first MII is identified 105. A cryptographic operation is run 106 to generate a second (expected) MII from symbols of the message located before the first MII. The second MII is compared 107 with the first MII received in the message. If the first and second MIIs match 108, the device continues to receive the message 109. If they do not match then radio reception is disabled 110 so that the rest of the message is not received.

Figure 11:
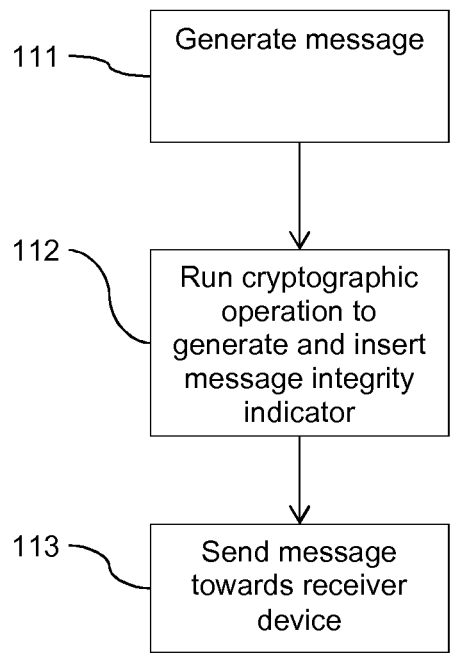
FIG. 11 is a flow diagram illustrating the steps carried out by a node acting as a sender device sending a message to the receiver device.

FIG. 11 is a flow diagram illustrating the steps carried out by a node acting as a sender device 101 to send a message to the receiver device 102. The message is generated 111. The cryptographic operation is run 112 over the symbols before the verification point to generate a first MII 204, which is inserted into the message. The message is then sent 113 towards the receiver device 102.

Figure 12:
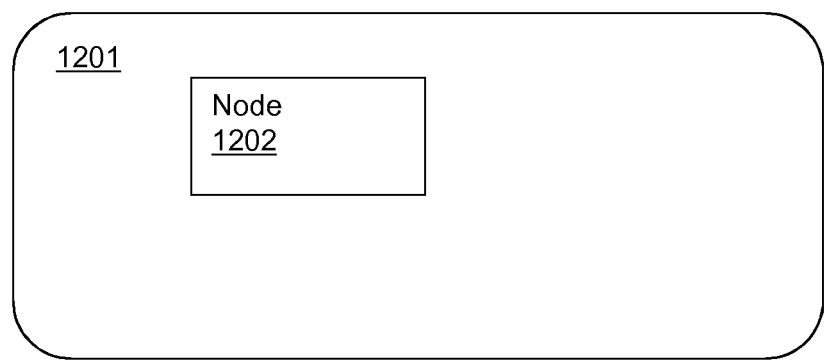
FIG. 12 is a schematic diagram of a vehicle including a network node.

FIG. 12 is a schematic diagram illustrating a vehicle 1201 including a node 1202, which could act as a sender device 101 or receiver device 102 as described above.

The system described above enables a wireless device to switch its radio off as early as possible, thereby saving energy and resources. In particular it improves the operation of DRX methods in the presence of adversaries. An adversary can inject spoofed messages during the "awake" cycle of DRX. The system described reduces energy waste associated with radio reception and processing of spoofed messages. Even where M2M devices are connected directly to the mains, such devices are often configured in energy saving modes for sustainability purposes.

Various properties of the system described are helpful for its applicability in practice. The system enables the packet format prescribed by the IEEE 802.15.4 specification to be maintained, which provides for backward compatibility. The system can incorporate checkpoints representing authentication verification information on the MAC layer without disrupting the packet format defined by the specification. This provides a smooth integration into the standard, and also allows nodes that do not employ the described approach to participate in the communication. This fact has a major significance for multi-hop networks, since the presence of nodes not implementing the approach will not affect packet forwarding.

In addition, the authorization indicators employed may have low complexity with respect to the computational and memory resources, and it is therefore possible to carry out the authentication without slowing down the receiver. The system can be implemented with a very low complexity. The processing of message integrity indicators representing authentication verification information is done one-the-fly, simultaneously with the sequential reception of message bits (or, more generally, symbols). As soon as the first message integrity indicator does not pass, the receiver is disabled from further reception.

It will be appreciated that the system is particularly applicable to applications where the power savings from the use of DRX outweigh the power costs of switching the radio back on.

The invention claimed is:

1. A node for use in a wireless network, comprising:
a processor and a memory, said memory containing instructions executable by said processor to cause the processor to:
receive a message using radio reception from a sender device in the network, the message being formed by a plurality of symbols and including a first message integrity indicator located at a predetermined distance from the start of the message such that further elements of the message are included after the message integrity indicator;
determine the position of the first message integrity indicator in the message;
perform a cryptographic operation on at least some of the symbols of the message so as to generate a second message integrity indicator before the first message integrity indicator is received;

compare the second message integrity indicator with the first message integrity indicator; and indicate that the message is not authorized responsive to when the second message integrity indicator does not match the first message integrity indicator.

2. The node of claim 1, wherein the memory further contains instructions to cause the processor to perform the cryptographic function on the symbols of the message as they arrive so as to generate the second message integrity indicator before the first symbol of the first message integrity indicator is received.

3. The node of claim 2, wherein the memory further contains instructions to cause the processor to compare symbols of the second message integrity indicator with symbols of the first message integrity indicator as the symbols of the first message integrity indicator are received.

4. The node of claim 1, wherein the memory further contains instructions to cause the processor to disable radio reception in response to the indication that the message is not authorized.

5. The node of claim 4, wherein the memory further contains instructions to cause the processor to re-enable radio reception a predetermined time after reception is disabled.

6. The node of claim 1, wherein the memory further contains instructions to cause the processor to execute the cryptographic operation using a key shared with the sender device.

7. The node of claim 1, wherein the memory further contains instructions to cause the processor to comprise a hash function in the cryptographic operation.

8. The node of claim 1, wherein the memory further contains instructions to cause the processor to locate the first message integrity indicator in a header portion of the message.

9. The node of claim 1, wherein the memory further contains instructions to cause the processor to generate one or more additional expected message integrity indicators during receipt of the message, and the comparator unit is configured to compare the additional expected message integrity indicators with additional message integrity indicators located later in the message than the first message integrity indicator, and indicate that the sender device is not authenticated if any of the additional expected message integrity indicators do not match their corresponding received message integrity indicators.

10. The node of claim 1, wherein the memory further contains instructions to cause the processor to indicate the location of the first message integrity indicator in the start of the message.

11. The node of claim 1, wherein the memory further contains instructions to cause the processor to identify the location of the first message integrity indicator from the cryptographic operation.

12. The node of claim 1, wherein the memory further contains instructions to cause the processor to use all of the message symbols located before the first message integrity indicator when carrying out the cryptographic operation to generate the second message integrity indicator.

13. The node of 1, wherein the memory further contains instructions to cause the processor to carry out the cryptographic operation on only a sequence number contained in the header of the message to generate the second message integrity indicator.

14. The node of claim 13, wherein the memory further contains instructions to cause the processor to become aware of the sequence number of the message before the message is received.

15. The node of claim 1, wherein the memory further contains instructions to cause the processor to operate a finite state machine.

16. The node of claim 1, wherein the memory further contains instructions to cause the processor to operate at the physical layer or data link layer of the network.

17. The node of claim 1, wherein the memory further contains instructions to cause the processor to enable radio reception only in predetermined timeslots using Discontinuous Reception.

18. The node of claim 1, wherein the memory further contains instructions to cause the processor to provide each symbol in the message so that the respective symbol corresponds to a single bit.

19. The node of claim 1, which node is an M2M device.

20. A method of authorizing a message received at a node in a wireless network, the method comprising:

receiving the message using radio reception from a sender device in the network, the message being formed by a plurality of symbols and including a first message integrity indicator located at a predetermined distance from the start of the message such that further symbols of the message are included after the first message integrity indicator;

determining the position of the first message integrity indicator in the message;

performing a cryptographic operation on at least some of the symbols of the message before the first message integrity indicator so as to generate a second message integrity indicator before the first message integrity indicator is received;

comparing the second message integrity indicator with the first message integrity indicator; and indicating that the message is not authorized responsive to when the second message integrity indicator does not match the first message integrity indicator.

21. The method of claim 20, wherein the cryptographic function is performed on the symbols of the message as they arrive so as to generate the second message integrity indicator before the first symbol of the first message integrity indicator is received.

22. The method of claim 20, further comprising disabling radio reception of the node in response to the indication that the message is not authorized.

23. The method of claim 20, wherein the cryptographic operation uses a key shared with the sender device.

24. A computer program product comprising a non-transitory computer readable storage medium storing code, which when run on a device, causes the device to execute the method according to claim 20.

* * * * *